United States Patent
Kimura

(10) Patent No.: US 9,287,594 B2
(45) Date of Patent: Mar. 15, 2016

(54) ELECTRIC STORAGE APPARATUS AND VEHICLE

(75) Inventor: Kenji Kimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 14/359,461

(22) PCT Filed: Nov. 24, 2011

(86) PCT No.: PCT/JP2011/006541
§ 371 (c)(1),
(2), (4) Date: May 20, 2014

(87) PCT Pub. No.: WO2013/076770
PCT Pub. Date: May 30, 2013

(65) Prior Publication Data
US 2014/0295242 A1 Oct. 2, 2014

(51) Int. Cl.
*H01M 10/50* (2006.01)
*H01M 10/613* (2014.01)
*H01M 2/10* (2006.01)
*H01M 10/625* (2014.01)
*H01M 10/643* (2014.01)
*H01M 10/6554* (2014.01)
*H01M 10/6555* (2014.01)
*H01M 10/617* (2014.01)

(52) U.S. Cl.
CPC ........ *H01M 10/5004* (2013.01); *H01M 2/1072* (2013.01); *H01M 10/503* (2013.01); *H01M 10/5016* (2013.01); *H01M 10/5053* (2013.01); *H01M 10/613* (2015.04); *H01M 10/617* (2015.04); *H01M 10/625* (2015.04); *H01M 10/643* (2015.04); *H01M 10/6554* (2015.04); *H01M 10/6555* (2015.04); *H01M 2220/20* (2013.01)

(58) Field of Classification Search
CPC ............... H01M 10/5004; H01M 10/5016; H01M 10/503; H01M 10/5053; H01M 10/613; H01M 10/617; H01M 10/625; H01M 10/643; H01M 10/6554; H01M 10/6555; H01M 2220/20; H01M 2/1072
See application file for complete search history.

(56) References Cited

U.S. PATENT DOCUMENTS

| | | |
|---|---|---|
| 2003/0186114 A1 | 10/2003 | Lohr et al. |
| 2009/0004555 A1 | 1/2009 | Lohr et al. |
| 2010/0028765 A1* | 2/2010 | Doege ................ H01M 2/1094 429/120 |
| 2012/0242291 A1 | 9/2012 | Kimura |

FOREIGN PATENT DOCUMENTS

| | | |
|---|---|---|
| CN | 102005601 A | 4/2011 |
| EP | 2 290 728 A1 | 3/2011 |
| JP | A-2000-021456 | 1/2000 |
| JP | A-2003-297438 | 10/2003 |
| JP | 2010-272378 A | 12/2010 |

* cited by examiner

*Primary Examiner* — Patrick Ryan
*Assistant Examiner* — Ben Lewis
(74) *Attorney, Agent, or Firm* — Oliff PLC

(57) ABSTRACT

An electric storage apparatus includes a plurality of cells and a holding member holding the plurality of cells, wherein a thermal resistance value between each of first cells of the plurality of cells and the holding member is lower than a thermal resistance value between each of second cells of the plurality of cells adjacent to the first cell and the holding member, the first cell being located at an end portion of the holding member in a state in which the plurality of cells are held by the holding member.

11 Claims, 11 Drawing Sheets

ELECTRIC STORAGE APPARATUS AND VEHICLE

TECHNICAL FIELD

The present invention relates to an electric storage apparatus having an assembled battery including a plurality of cells of cylindrical shape connected to each other.

BACKGROUND ART

Some of conventional assembled batteries including a plurality of cells have a known configuration in which each of the plurality of cells is held by a member made of a thermally conductive material (see, for example, Patent Document 1).

The holding of the plurality of cells by the member made of the thermally conductive material reduces variations in temperature between the plurality of cells constituting the assembled battery.

PRIOR ART DOCUMENT

Patent Document

[Patent Document 1] Japanese Patent Laid-Open No. 2003-297438

DISCLOSURE OF THE INVENTION

Problems to be Solved by the Invention

In the plurality of cells held as the assembled battery, however, cells located closer to an end portion of the assembled battery have less heat dissipation when those cells generate heat than cells located closer to the center of the assembled battery and surrounded by the other cells, with the result that the generated heat is concentratedly conducted to cells around the cells located at the end portion.

It is thus an object of the present invention to provide a technology for preventing heat generated by a cell of a plurality of cells held as an assembled battery that is located closer to an end portion of the assembled battery from being concentratedly conducted to cells around the cell located closer to the end portion.

Means for Solving the Problems

To solve the abovementioned problem, the present invention provides (1) an electric storage apparatus including a plurality of cells and a holding member holding the plurality of cells, wherein a thermal resistance value between each of first cells of the plurality of cells and the holding member is lower than a thermal resistance value between each of second cells of the plurality of cells adjacent to the first cell and the holding member, the first cell being located at an end portion of the holding member in a state in which the plurality of cells are held by the holding member. With this configuration, in the assembled battery in which the plurality of cells are held by the holding member made of a thermally conductive material, the amount of conducted heat from the first cell located at the end portion of the holding member to the second cell disposed adjacent to the first cell can be limited to a low level.

(2) In the configuration of (1), the volume of a low-thermal-conductivity layer present between the second cell and the holding member and having a thermal conductivity lower than that of the holding member is larger than the volume of the low-thermal-conductivity layer present between the first cell and the holding member.

In the configuration of (1) or (2), preferably, the holding member is provided with a plurality of holes for holding the plurality of cells, and some of the holes for holding the first cells have an internal diameter smaller than that of some of the holes for holding the second cells. Thus, the volume of a gap present between the second cell and the holding member is larger than the volume of a gap present between the first cell and the holding member. As a result, the thermal resistance between the second cell and the holding member is larger than the thermal resistance between the first cell and the holding member.

(4) In the configuration of (1) or (2), the area of contact between the second cell and the holding member is smaller than an area of contact between the first cell and the holding member.

(5) In the configuration of any one of (1) to (4), the plurality of cells are fixed to the holding member by inserting the plurality of cells into the plurality of holes formed in the holding member and, in this state, filling an adhesive into a gap between each of the plurality of cells and each of the plurality of holes, and the adhesive filled in the gap forms at least part of the low-thermal-conductivity layer.

(6) In the configuration of any one of (1) to (5), the holding member is provided by stacking a plurality of holding plates in a longitudinal direction of the plurality of cells, and the internal diameter of the hole formed for holding the second cell in a first holding plate of the plurality of holding plates is different from the internal diameter of the hole formed for holding the second cell in another one of the plurality of holding plates.

(7) In the configuration of (5), the thermal conductivity of a first adhesive filled between the first cell and the holding member is higher than the thermal conductivity of a second adhesive filled between the second cell and the holding member.

(8) In the configuration of anyone of (1) to (7), the first cell is one of the plurality of cells arranged in a rectangular shape that is located at a corner position in a direction of arrangement.

(9) In the configuration of any one of (1) to (8), in a state in which the second cell is inserted through and held in the hole for inserting the second cell in the holding member, the second cell is placed such that a gap formed between the outer circumferential face of the second cell and the inner circumferential face of the hole is smaller on a far side less closer to the first cell and is larger on a near side closer to the first cell.

Thus, the second cell is positioned, with respect to the inner circumferential wall of the hole formed in the holding member, farther from the first cell and closer to a third cell adjacent to the second cell and different from the first cell. This can provide the configuration which suppresses the heat conduction between the second cell and the first cell and does not prevent the heat conduction between the second cell and the third cell.

(10) In the configuration of any one of (1) to (9), the plurality of cells are connected in parallel. This configuration can effectively suppress an increase in temperature variations due to the parallel connection of the cells.

(11) A vehicle according to the present invention preferably includes the electric storage apparatus of the configuration of any one of (1) to (10).

Advantage of the Invention

The present invention can prevent the technology for preventing heat generated by the cell of the plurality of cells held as the assembled battery that is located closer to the end portion of the assembled battery from being concentratedly conducted to the cells around the cell located closer to the end portion.

MODE FOR CARRYING OUT THE INVENTION

An electric storage apparatus according to the present embodiments will hereinafter be described with reference to the drawings.

The electric storage apparatus according to the present embodiments can be mounted on a vehicle, and examples of the vehicle include a hybrid car and an electric car. The hybrid car includes not only the electric storage apparatus but also an internal-combustion engine or a fuel cell as the power source generating the energy (kinetic energy) for running the vehicle. The electric car runs only with the output from the electric storage apparatus.

Embodiment 1

Embodiment 1 of the present invention is first described.

Figure 1:
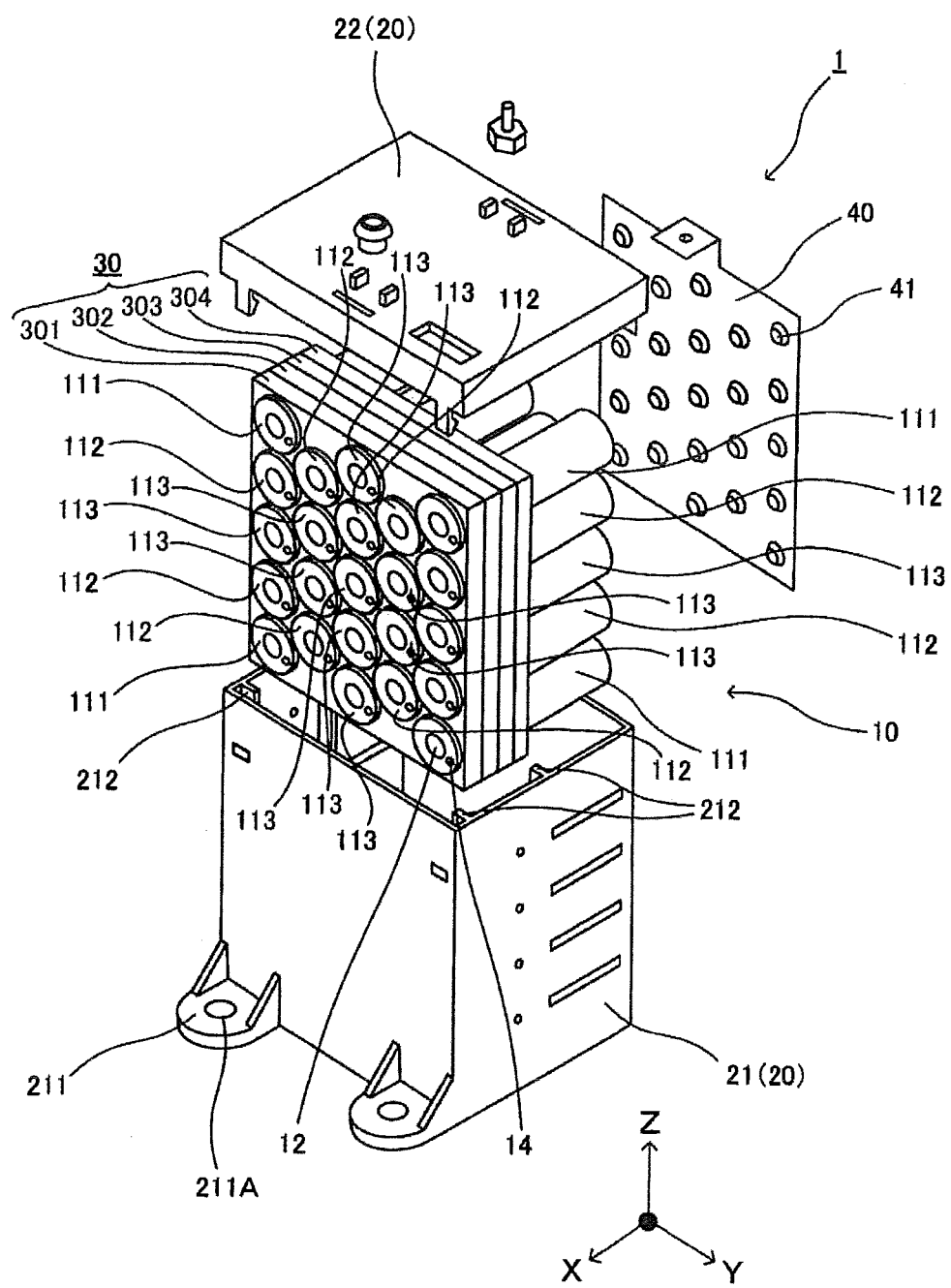
FIG. 1 is an exploded perspective view of an electric storage apparatus according to Embodiment 1.
Figure 2:
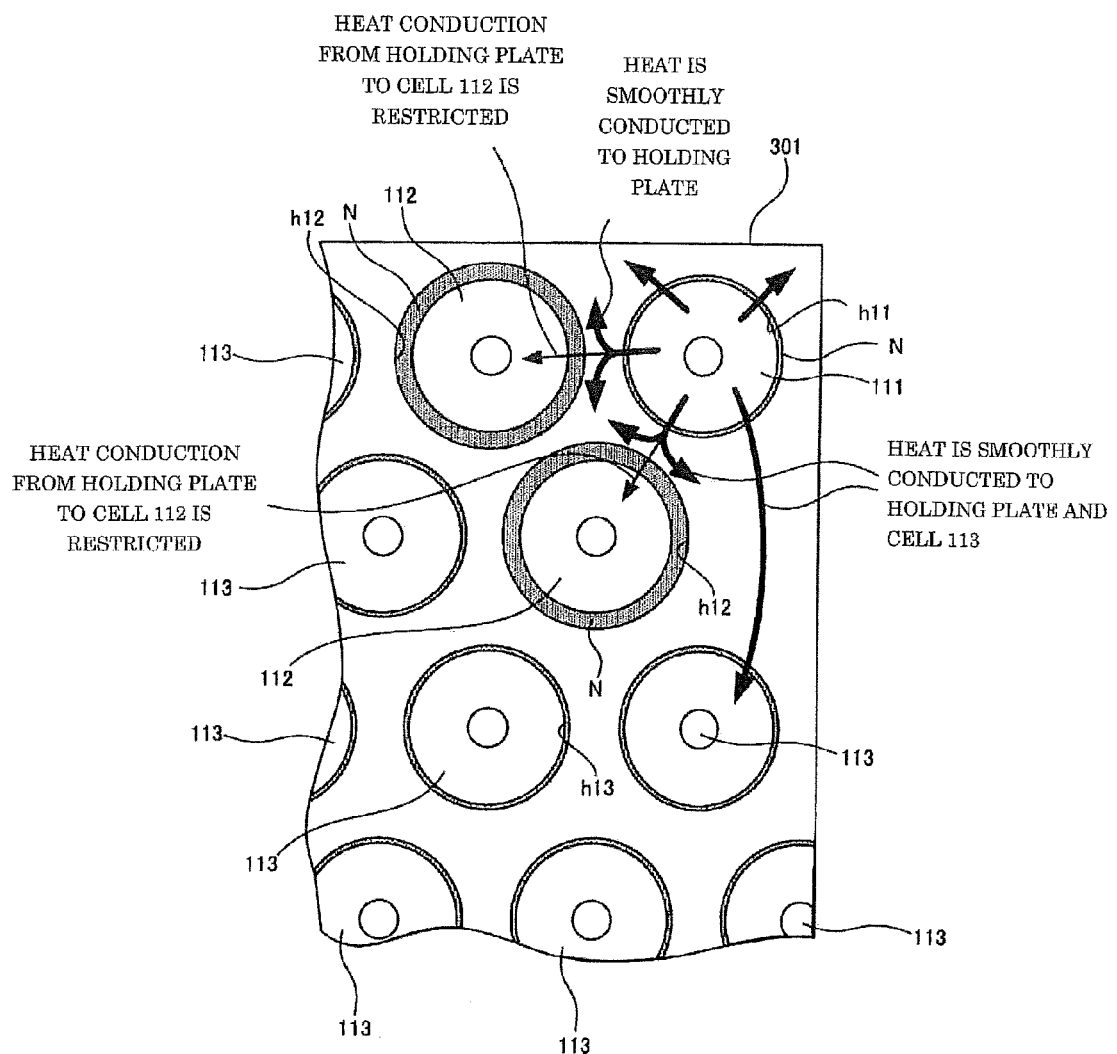
FIG. 2 is a diagram showing a holding plate 301 near its corner viewed from an X axis direction in an assembled battery 10 included by an electric storage apparatus 1.
Figure 3:
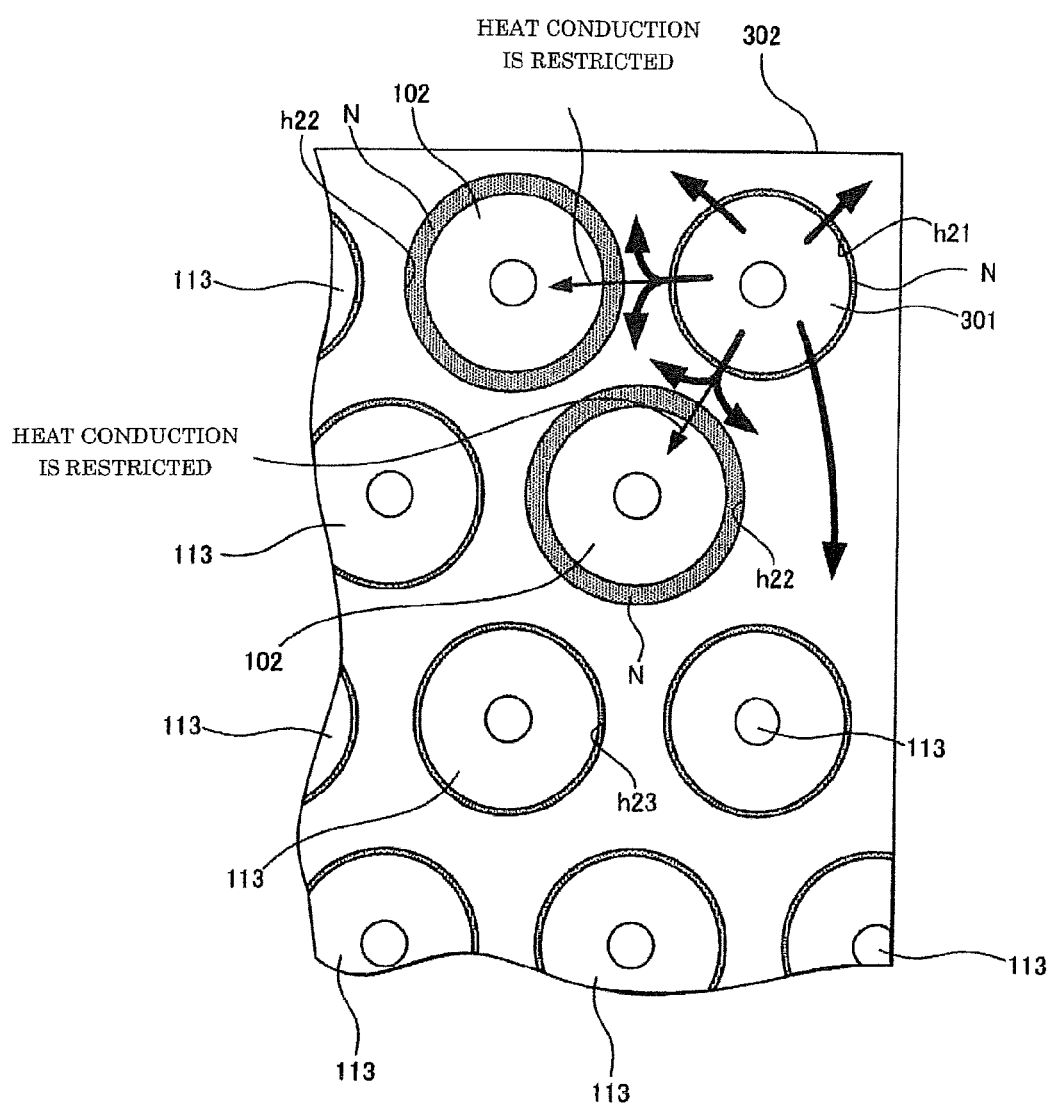
FIG. 3 is a diagram showing a holding plate 302 near its corner viewed from the X axis direction in the assembled battery 10 included by the electric storage apparatus 1.
Figure 4:
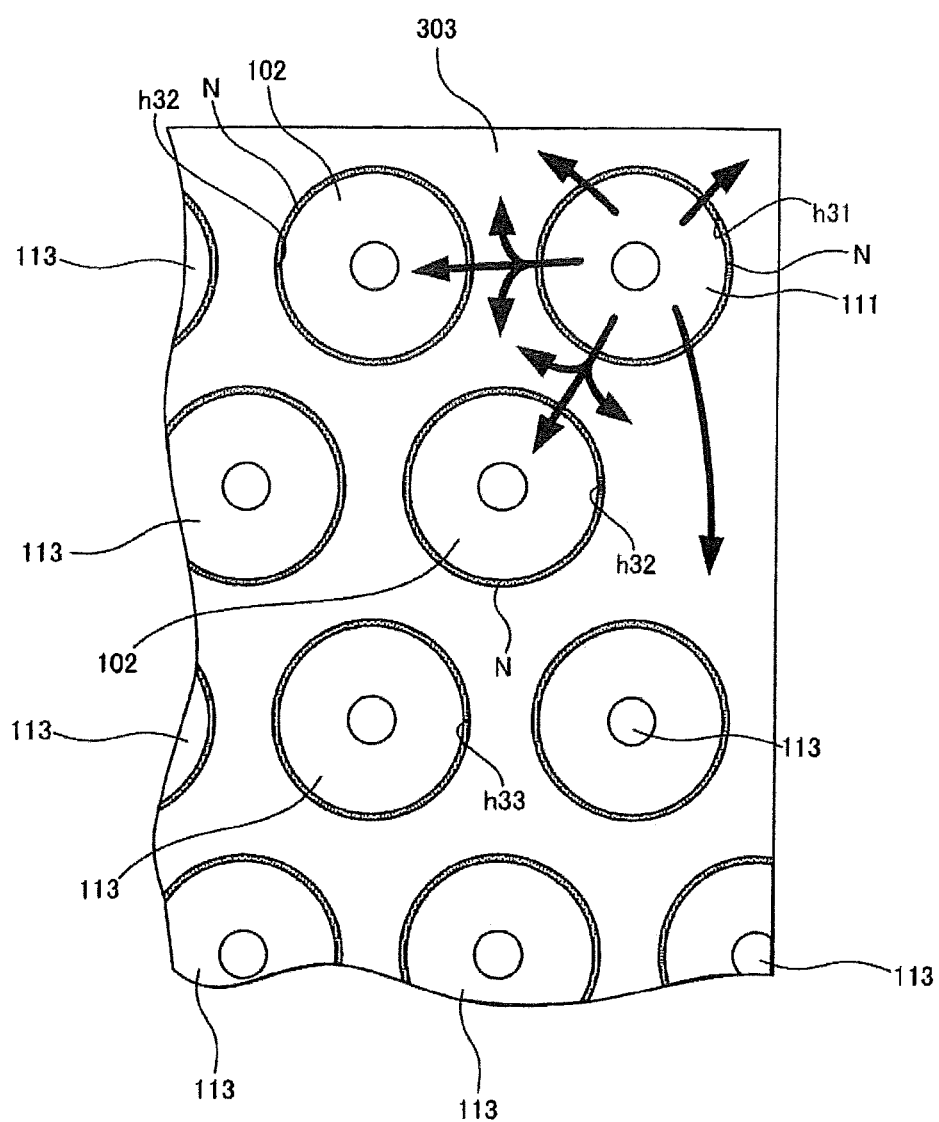
FIG. 4 is a diagram showing a holding plate 303 near its corner viewed from the X axis direction in the assembled battery 10 included by the electric storage apparatus 1.
Figure 5:
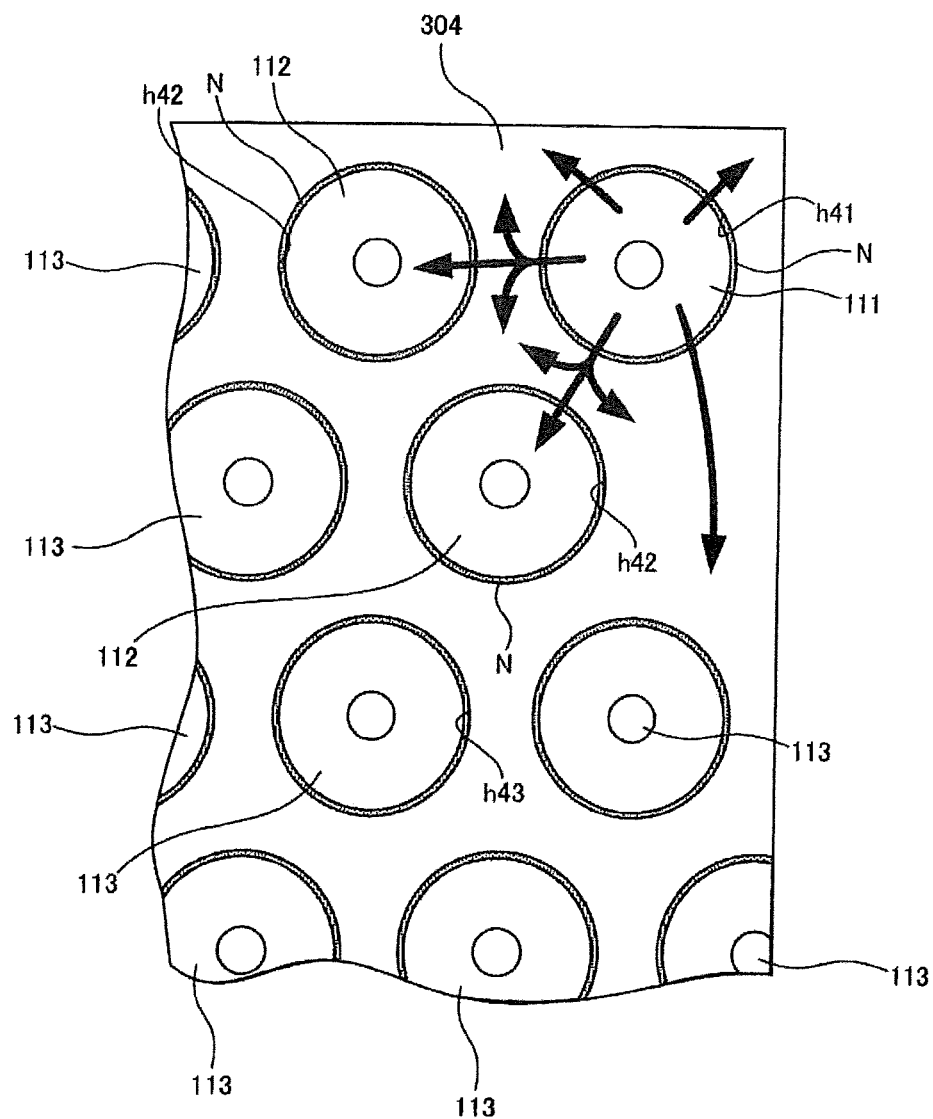
FIG. 5 is a diagram showing a holding plate 304 near its corner viewed from the X axis direction in the assembled battery 10 included by the electric storage apparatus 1.
Figure 6:
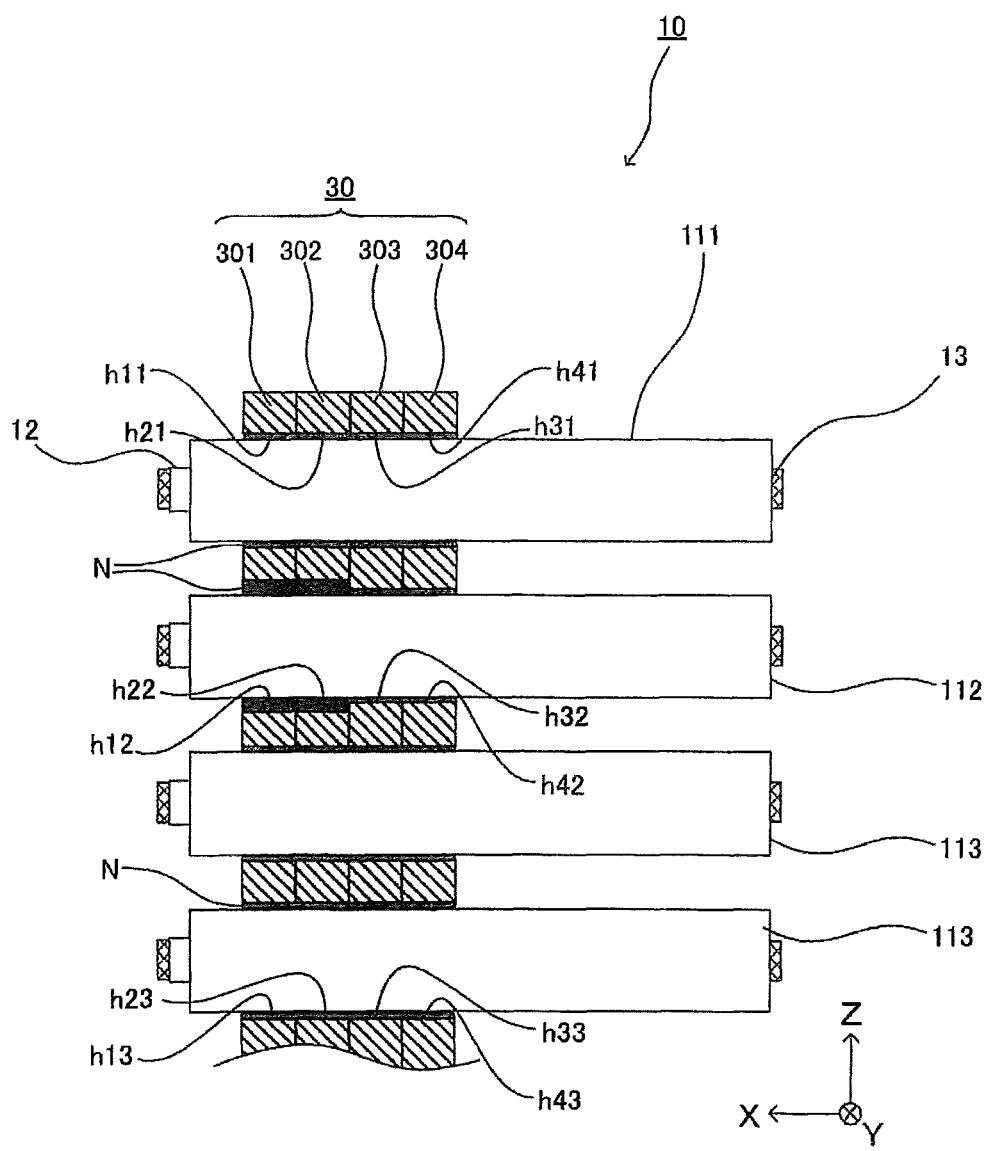
FIG. 6 is a section view in an X-Z plane of the assembled battery 10 near its corner included by the electric storage apparatus 1.

FIG. 1 is an exploded perspective view of the electric storage apparatus. An X axis, a Y axis, and a Z axis represent three axes orthogonal to each other, and the X axis direction corresponds to a longitudinal direction of a cell. FIG. 2 shows a holding plate 301 near its corner viewed from the X axis direction in an assembled battery 10 included by an electric storage apparatus 1. FIG. 3 shows a holding plate 302 near its corner viewed from the X axis direction in the assembled battery 10 included by the electric storage apparatus 1. FIG. 4 shows a holding plate 303 near its corner viewed from the X axis direction in the assembled battery 10 included by the electric storage apparatus 1. FIG. 5 shows a holding plate 304 near its corner viewed from the X axis direction in the assembled battery 10 included by the electric storage apparatus 1. FIG. 6 is a section view in an X-Z plane of the assembled battery 10 near its corner included by the electric storage apparatus 1.

As shown in FIG. 1, the electric storage apparatus 1 includes the assembled battery 10, a case 20, and a bus bar 40. The assembled battery 10 includes a plurality of cells 111 to 113 (described later in detail). Each of the cells 111 to 113 may be a secondary battery such as a lithium-ion battery or a nickel metal hydride battery. Each of the cells 111 to 113 is formed in a cylindrical shape and has a positive electrode terminal 12 and a gas discharge valve 14 at one end and a negative electrode terminal 13 at the other end in the longitudinal direction (a direction orthogonal to the direction of the arrangement of the plurality of cells 111 to 113 or the X axis direction) (see FIG. 6). The plurality of cells 111 to 113 are arranged such that the end portions in the longitudinal direction are aligned to form a rectangular shape in a diameter direction of the cells 111 to 113. Although the plurality of cells 111 to 113 are designated with the different reference numerals for convenience of explanation, all of them are provided by using the same cell.

As shown in FIG. 1, the plurality of cells 111 to 113 are connected in parallel through the bus bar 40. FIG. 1 shows only the bus bar 40 connected to the negative electrode terminals 13, and a bus bar connected to the positive electrode terminals 12 is omitted. The bus bar 40 has a plurality of weld portions 41 formed thereon to which the negative electrode terminals 13 of the cells 111 to 113 are to be welded. The weld portion 41 is elastically deformable in the X axis direction. This can accommodate dimensional errors of the cells 111 to 113.

The holding member 30 consists of four holding plates 301 to 304 with a rectangular profile stacked in the longitudinal direction of the cells 111 to 113 (see FIG. 1 and FIG. 6). Each of the holding plates 301 to 304 has a plurality of holes at positions matching the positions of the cells to be held thereby. The specific configuration of the holes is described later.

As shown in FIG. 3 to FIG. 6, the cells 111 to 113 are inserted in the holes formed in the associated holding plates 301 to 304, and an adhesive N is filled between the inner circumferential faces of the holes and the outer circumferential faces of the cells to hold the cells 111 to 113 on the holding member 30.

The holding of the cells 111 to 113 on the holding member 30 can achieve the heat dissipation function of conducting the heat of one of the cells 111 to 113 that has a higher temperature to the other cells having a lower temperature. This can reduce variations in temperature between the cells. Since the holding member 30 can be provided with both the holding function of holding the cells and the heat dissipation function, the number of parts can be reduced to enable cost reduction. In other words, since an independent heat dissipation member for dissipating the heat of the cells is not required, the cost can be reduced.

Each of the holding plates 301 to 304 may be made of metal. The holding plates 301 to 304 made of metal can enhance the heat dissipation effect to effectively reduce the variations in temperature between the cells. The metal may be aluminum, copper, or iron. Since aluminum has an extremely high thermal conductivity, the holding plates 301 to 304 made of aluminum can effectively reduce the variations in temperature between the cells. Since aluminum is lightweight, the holding plates 301 to 304 made of aluminum can reduce the weight of the electric storage apparatus 1. Since aluminum is low in cost, the holding plates 301 to 304 made of aluminum can cut the cost of the electric storage apparatus 1.

When the cells 111 to 113 are connected in parallel, the cells tend to have larger temperature variations than in series connection. This is described next in detail with reference to FIG. 7.

Figure 7:
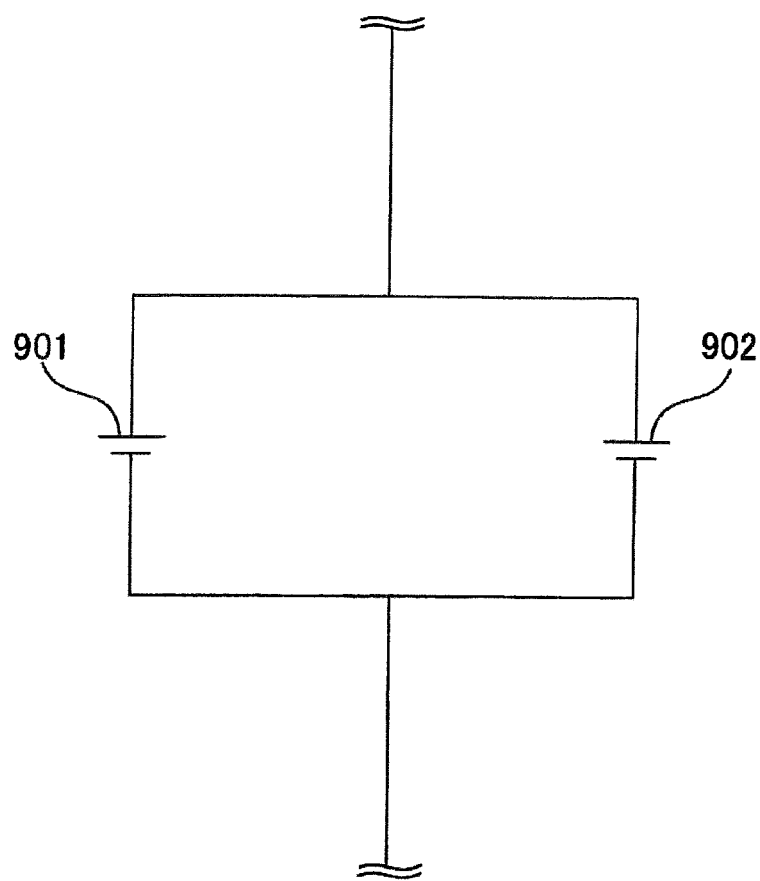
FIG. 7 is a circuit diagram in which a first cell 901 having an internal resistance R1 and a second cell 902 having an internal resistance R2 are connected in parallel.

FIG. 7 is a circuit diagram in which a first cell 901 having an internal resistance R1 and a second cell 902 having an internal resistance R2 are connected in parallel. It is assumed that the first cell 901 has a current value of I1 and the second cell 902 has a current value of I2. The internal resistance of the battery decreases as the temperature of the battery rises. For example, when the temperature of the first cell 901 becomes higher than the temperature of the second cell 902, the internal resistance R1 of the first cell 901 becomes lower than the internal resistance R2 of the second cell 902, whereas the current value I1 of the first cell 901 becomes higher than the current value I2 of the second cell 902. Since the amount of generated heat is calculated by multiplying the square of the current value by the internal resistance, the first cell 901 has the amount of generated heat larger than that of the second cell 902 to cause a larger temperature difference between the first cell 901 and the second cell 902.

In contrast, when the first cell 901 and the second cell 902 are connected in series, the value of the current passing through the first cell 901 is identical to the value of the current passing through the second cell 902. Thus, the parallel connection involving the difference in the current value between the first cell 901 and the second cell 902 is more likely to produce the difference in the amount of generated heat between the cells and thus to cause a larger temperature difference between the first cell 901 and the second cell 902 than the series connection involving no difference in the current value.

In the condition in which the parallel connection of the cells 111 to 113 tends to increase the temperature difference between them, however, the configuration of the present embodiment can prevent the heat generated in each of the cells from being concentratedly conducted to the second cell 902 to effectively suppress an increase in temperature variations between the cells 111 to 113.

Returning to the description of the electric storage apparatus 1, the case 20 includes a case body 21 and a lid body 22. The case body 21 is formed in a bottomed tubular shape and includes a leg portion 211 at its lower end. The leg portion 211 has a fastening hole 211A formed therein for fixing the electric storage apparatus 1. The electric storage apparatus 1 may be fixed to a floor panel of the vehicle. The case 20 has, on its inner face, a pair of incorporating guide portions 212 for incorporating the holding member 30. The incorporating guide portion 212 extends in an up-down direction. The holding member 30 can be slid along the pair of incorporating guide portions 212 to house the assembled battery 10 into the case body 21.

The case body 21 has coolant inflow ports formed in one end face in the Y axis direction and extending in the longitudinal direction of the cell, and has coolant outflow ports formed in the other end face in the Y axis direction and extending in the longitudinal direction of the cell. A plurality of such coolant inflow ports and a plurality of such coolant outflow ports are formed at predetermined intervals in a height direction (Z axis direction) of the electric storage apparatus 1. The coolant inflow port is connected to an intake duct, not shown, and a blower is operated to direct air serving as a coolant into the case 20 through the intake duct and the coolant inflow port.

Next, detailed description is made of a structure for holding the cells with the holding plates 301 to 304 according to the present embodiment.

The electric storage apparatus according to the present invention is configured such that the thermal resistance between the holding member 30 and each of the first cells 111 disposed at a corner position (end position) in the direction of the arrangement of the plurality of cells 111 to 113 is lower than the thermal resistance between the holding member 30 and each of the second cells 112 adjacent to the first cell 111. The third cell 113 refers to the cell other than the first cell 111 and the second cell 112 of the plurality of cells.

Thus, in the assembled battery including the plurality of arranged cells 111 to 113 held by the holding member 30 made of the thermally conductive material, the amount of conducted heat from the first cell 111 located at the end portion of the holding member 30 to the second cell 112 disposed adjacent to the first cell 111 can be limited to a low level. The first cell 111 located at the end portion of the holding member 30 specifically refers to the cell disposed closest to the end portion of the holding member 30 out of the plurality of cells 111 to 113.

Specifically, a low-thermal-conductivity layer present between the second cell 112 and the holding member 30 and having a thermal conductivity lower than that of the holding member 30 is set to have a volume larger than that of the low-thermal-conductivity layer present between the first cell 111 and the holding member 30. The low-thermal-conductivity layer corresponds to the adhesive layer N made of the adhesive (see FIG. 6), for example. The low-thermal-conductivity layer is not necessarily formed only of the adhesive layer N but may be formed partially of an air layer or a material having a high thermal resistance value.

At least some of the holes formed in the holding member 30 for holding the second cell 112 (specifically, holes h12 formed in the holding plate 301 and holes h22 formed in the holding plate 302) have an internal diameter larger than that of at least some of the holes formed in the holding member 30 for holding the first cell 111 (holes h11 formed in the holding plate 301, holes h21 formed in the holding plate 302, holes h31 formed in the holding plate 303, and holes h41 formed in the holding plate 304). In this case, each of sets of the holes h11 and h13 formed in the holding plate 301, the holes h21 and h23 formed in the holding plate 302, the holes h31, h32, and h33 formed in the holding plate 303, and the holes h41, h42, and h43 formed in the holding plate 304 has the same internal diameter.

Thus, the internal diameter of the hole formed for holding the second cell 112 in the first holding plate out of the plurality of holding plates 301 to 304 is different from the internal diameters of the holes formed for holding the second cell 112 in the holding plates other than the first holding plate out of the plurality of holding plates 301 to 304.

The volume of the gap present between the second cell 112 and the holding member 30 is larger than the volume of the gap present between the first cell 111 and the holding member 30. As a result, the thermal resistance between the second cell 112 and the holding member 30 is larger than the thermal resistance between the first cell 111 and the holding member 30.

In other words, in the electric storage apparatus 1 according to the present embodiment, the area of contact between the second cell 112 and the holding member 30 is smaller than the area of contact between the first cell 111 and the holding member 30. The area of contact is not necessarily limited to direct contact between the cell and the holding member 30 but also includes indirect contact with the adhesive or the like interposed between them.

According to the configuration of the present embodiment, for example when the first cell 111 located at the corner position rises in temperature, the heat of the cell 111 is efficiently conducted to the portion other than the second cell 112 since the heat conduction path to the third cell 113 through the holding member 30 has a lower thermal resistance than that of the heat conduction path to the second cell 112 adjacent to the first cell 111.

In the present embodiment, the conduction of the heat generated in the first cell 111 to the second cell 112 is not completely blocked. In the holding plates 303 and 304, for example, the structure for holding the second cell 112 is identical to that for the first cell 111, so that the heat generated in the first cell 111 is conducted to the second cell 112 to some extent. This can achieve the function of reducing variations in temperature between the plurality of cells that is essentially provided by the holding plates.

This can prevent the heat generated in the first cell 111 located closer to the end portion of the assembled battery out of the plurality of cells arranged as the assembled battery from being concentratedly conducted to the second cell 112 adjacent to the first cell 111 located at the end portion.

Although the present embodiment has shown the first cell 111 located at the corner position in the arrangement direction out of the plurality of cells, the present invention is not limited thereto, and the first cell may be defined as the cells located on the outermost line (along the side (outer edge) except the corner position). In addition, the plurality of cells 111 to 113 are not necessarily arranged in regular lines, and it is only required that the cells 111 to 113 should be arranged to be held by the holding member 30.

Embodiment 2

Next, Embodiment 2 of the present invention is described.

Embodiment 2 is a modification of Embodiment 1 described above. In the following, components having the same functions as those of the components described in Embodiment 1 are designated with the same reference numerals, and description thereof is omitted.

Figure 8:
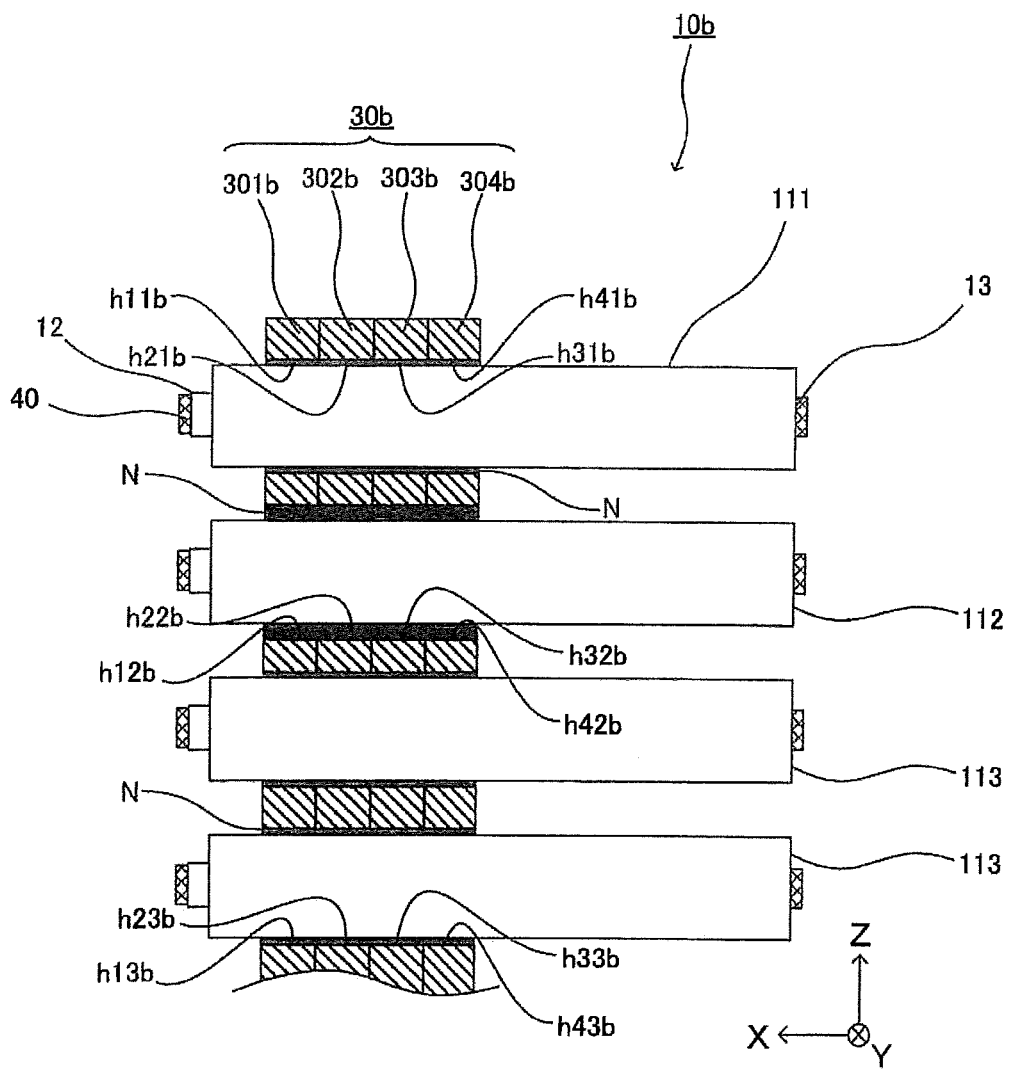
FIG. 8 is a section view showing an assembled battery 10b in an electric storage apparatus according to Embodiment 2 at the same position shown in FIG. 6.

FIG. 8 is a section view showing an assembled battery 10b in an electric storage apparatus according to Embodiment 2 at the same position shown in FIG. 6. In the assembled battery 10b of the present embodiment, a plurality of cells are held by a holding member 30b consisting of holding plates 301b to 304b.

In the example shown by FIG. 8, the holding plate 301b, the holding plate 302b, the holding plate 303b, and the holding plate 304b have holes of the same internal diameter formed to hold a second cell 112. With such a configuration, similarly to Embodiment 1, an adhesive N in a gap present between the second cell 112 and the holding member 30b has a volume larger than that of the adhesive N in a gap present between a first cell 111 and the holding member 30b. As a result, the thermal resistance between the second cell 112 and the holding member 30b is larger than the thermal resistance between the first cell 111 and the holding member 30b. This can achieve the same advantages as those of the configuration of Embodiment 1.

Embodiment 3

Next, Embodiment 3 of the present invention is described.

Embodiment 3 is a modification of Embodiments 1 and 2 described above. In the following, components having the same functions as those of the components described in Embodiments 1 and 2 are designated with the same reference numerals, and description thereof is omitted.

Embodiments 1 and 2 have focused on the internal diameters of the holes for holding the cells (the thicknesses of the thermal resistance layers) in the holding member. In contrast, the present embodiment focuses on the thermal conductivity of an adhesive filled between a cell and a holding member to fix the cell to the holding member.

Figure 9:
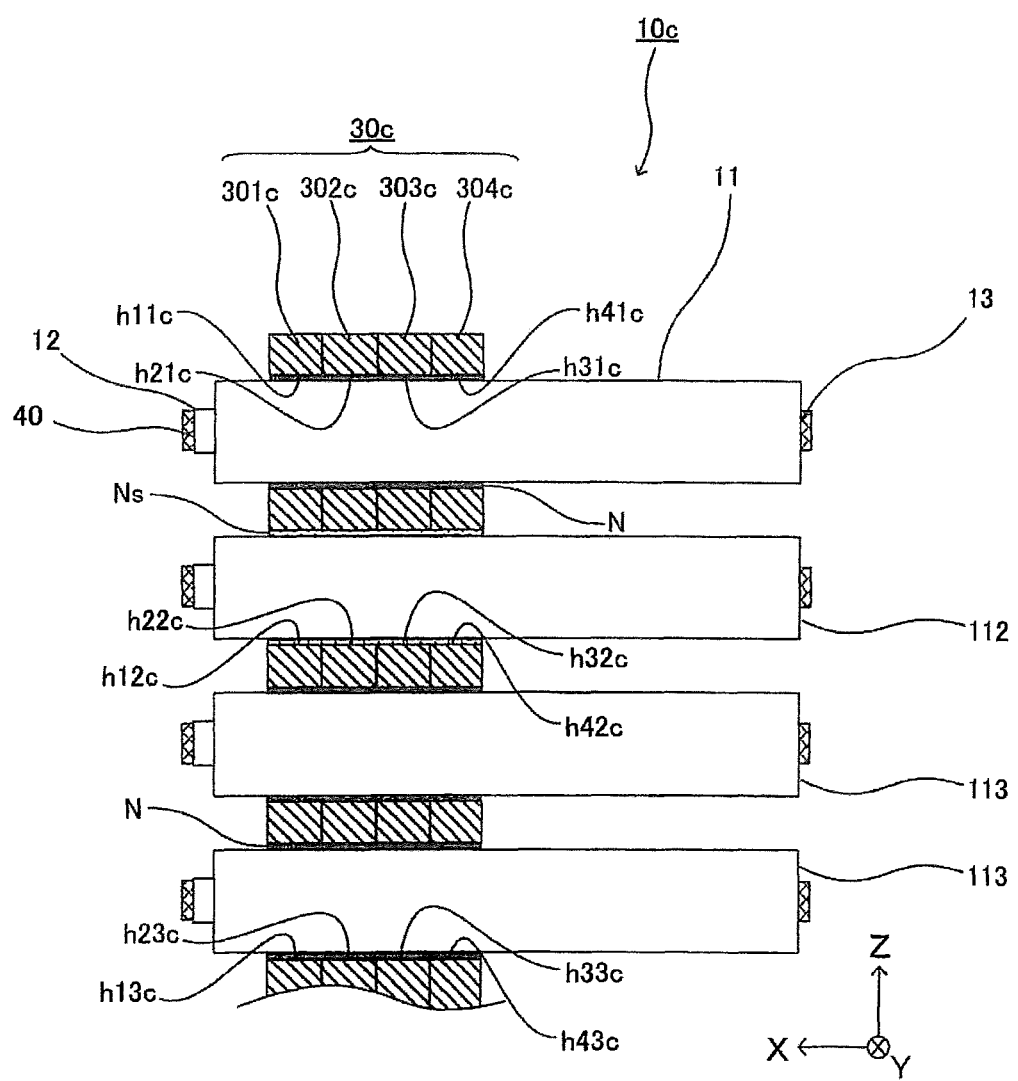
FIG. 9 is a section view showing an assembled battery 10c in an electric storage apparatus according to Embodiment 3 at the same position shown in FIG. 6.

FIG. 9 is a section view showing an assembled battery 10c in an electric storage apparatus according to Embodiment 3 at the same position shown in FIG. 6. In the assembled battery 10c of the present embodiment, a plurality of cells are held by a holding member 30c consisting of holding plates 301c to 304c.

In the example shown by FIG. 9, the holding plate 301c, the holding plate 302c, the holding plate 303c, and the holding plate 304c have holes h11c, h21c, h31c, h41, h12c, h22c, h32c, h42c, h13c, h23c, h33c, and h43c of the same internal diameter formed to hold first cells 111, second cells 112, and third cells 113.

The present embodiment is configured such that the thermal conductivity of a second adhesive Ns filled between the second cell 112 and the holding member 30c is lower than the thermal conductivity of a first adhesive N filled between the first cell 111 and the holding member 30c.

With such a configuration, the thermal resistance between the second cell 112 and the holding member 30c is higher than the thermal resistance between the first cell 111 and the holding member 30c. This can achieve the same advantages as those of the configuration of Embodiment 1.

Embodiment 4

Next, Embodiment 4 of the present invention is described.

Figure 10:
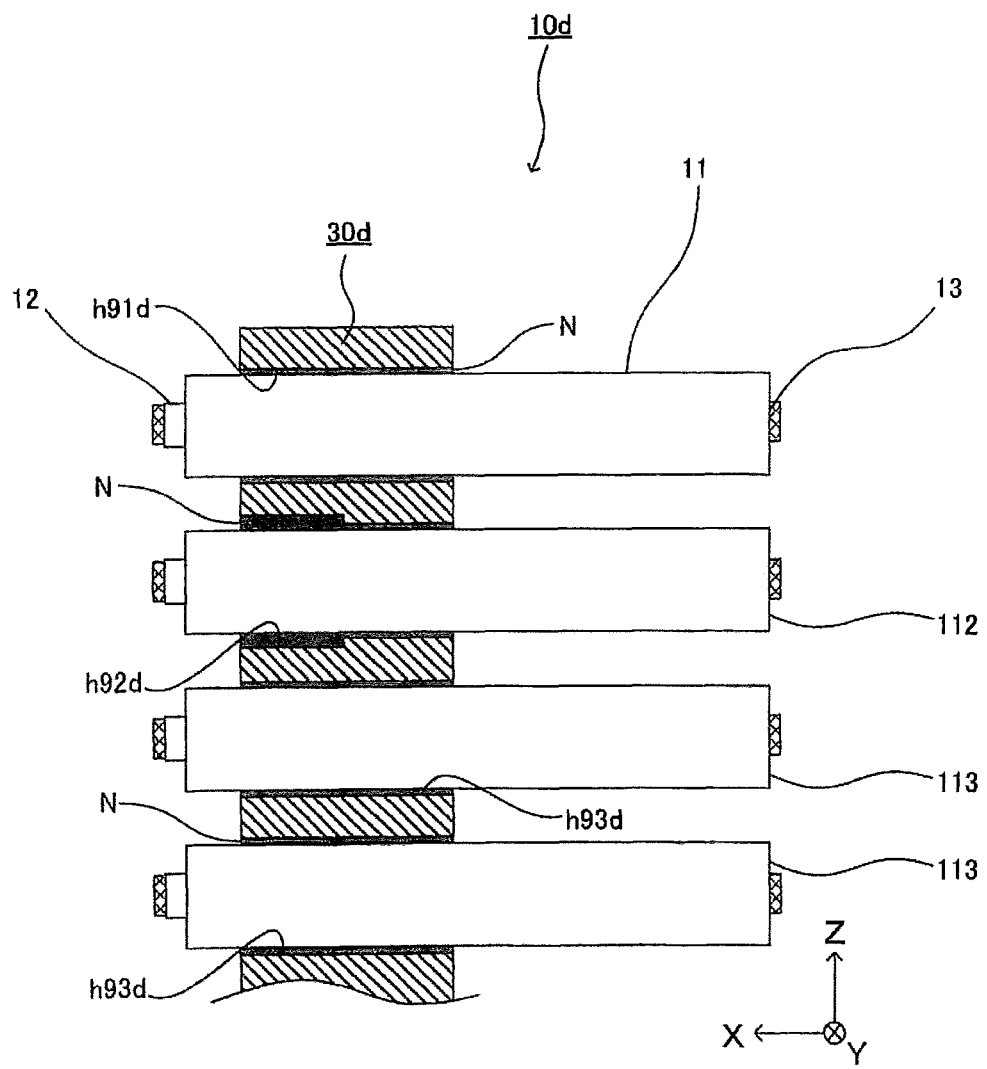
FIG. 10 is a section view showing an assembled battery 10d in an electric storage apparatus according to Embodiment 4 at the same position shown in FIG. 6.

Embodiment 4 is a modification of Embodiment 1 described above. In the following, components having the same functions as those of the components described in Embodiment 1 are designated with the same reference numerals, and description thereof is omitted. FIG. 10 is a section view showing an assembled battery 10d in an electric storage apparatus according to Embodiment 4 at the same position shown in FIG. 6.

Although the holding member 30 in Embodiment 1 is provided by stacking the four holding plates 301 to 304, a holding member 30d in Embodiment 4 is formed of a single plate-shaped member instead of the stack structure. Such a configuration can achieve the same advantages as those of the configuration of Embodiment 1.

The holding member 30d has a hole h91d for each first cell 111, a hole h92d for each second cell 112, and a hole h93d for each third cell 113 formed therein.

Embodiment 5

Next, Embodiment 5 of the present invention is described.

Embodiment 5 is a modification of Embodiment 2. In the following, components having the same functions as those of the components described in Embodiment 2 are designated with the same reference numerals, and description thereof is omitted.

Figure 11:
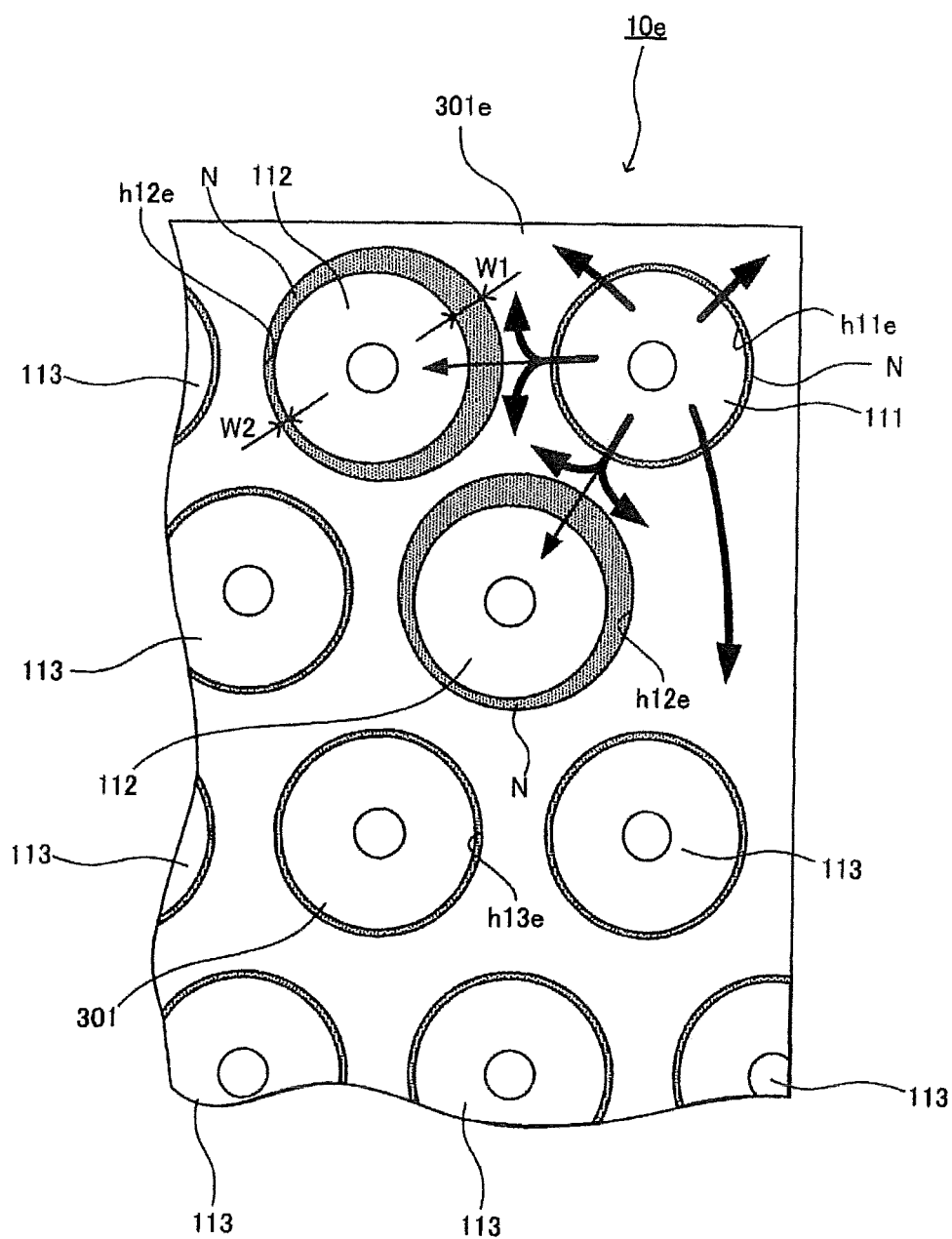
FIG. 11 is a diagram showing a holding plate 301e near its corner viewed from an X axis direction in an assembled battery 10e included by an electric storage apparatus according to Embodiment 5.

FIG. 11 is a diagram showing a holding plate 301e near its corner viewed from an X axis direction in an assembled battery 10e included by an electric storage apparatus according to Embodiment 5. A holding portion in the present embodiment has the same configuration as that of the holding member 30b shown in Embodiment 2. Thus, holding plates 301e to 304e included by the holding portion in Embodiment 5 correspond to the holding plates 301b to 304b in Embodiment 2.

Embodiment 5 differs from Embodiment 2 in the placement of second cells 112 on a holding member. Although FIG. 11 shows only the holding plate 301e for convenience of explanation in order to facilitate the understanding of the positional relationship between cells and holes in the holding member, the other holding plates 302e to 304e have the same positional relationship between their holes and the associated cells.

In FIG. 11, the second cell 112 is inserted through and held in a hole for inserting the second cell 112 into the holding member 30e (for example, a hole h12e shown in FIG. 11). In this state, the second cell 112 is placed with gaps W between the cuter circumferential face of the second cell 112 and the inner circumferential face of the hole h12e formed such that a gap W2 on a far side less closer to a first cell 111 is smaller than a gap W1 on a near side closer to the first cell 111.

Thus, the second cell 112 is positioned, with respect to the inner circumferential wall of the hole formed in the holding member 30e, farther from the first cell 111 and closer to a third cell 113 adjacent to the second cell 112 and different from the first cell 111. This can provide the configuration which suppresses the heat conduction between the second cell 112 and the first cell 111 (thickens a thermal resistance layer) and does not prevent the heat conduction between the second cell 112 and the third cell 113 (thins the thermal resistance layer).

The present embodiment shows the configuration in which the second cell 112 is biased within the circular hole. Alternatively, the hole for holding the second cell 112 may be formed in an oval shape or the like to produce a difference in thermal resistance value, for example.

Although the embodiments described above show the exemplary configuration of the holding member consisting of the four holding plates, this is only illustrative. The number of the holding plates constituting the holding member can be set as appropriate.

The invention claimed is:

1. An electric storage apparatus comprising:
a plurality of cells; and
a holding member holding the plurality of cells,
wherein a thermal resistance value between each of first cells of the plurality of cells and the holding member is lower than a thermal resistance value between each of second cells of the plurality of cells adjacent to the first cell and the holding member, the first cell being located at an end portion of the holding member in a state in which the plurality of cells are held by the holding member.

2. The electric storage apparatus according to claim 1, wherein a volume of a low-thermal-conductivity layer present between the second cell and the holding member and having a thermal conductivity lower than that of the holding member is larger than a volume of the low-thermal-conductivity layer present between the first cell and the holding member.

3. The electric storage apparatus according to claim claim 1, wherein the holding member is provided with a plurality of holes for holding the plurality of cells, and
some of the holes for holding the first cells have an internal diameter smaller than an internal diameter of some of the holes for holding the second cells.

4. The electric storage apparatus according to claim 1, wherein an area of contact between the second cell and the holding member is smaller than an area of contact between the first cell and the holding member.

5. The electric storage apparatus according to claim 1, wherein the plurality of cells are fixed to the holding member by inserting the plurality of cells into the plurality of holes formed in the holding member and, in this state, filling an adhesive into a gap between each of the plurality of cells and each of the plurality of holes, and
the adhesive filled in the gap forms at least part of the low-thermal-conductivity layer.

6. The electric storage apparatus according to claim 5, wherein a thermal conductivity of a first adhesive filled between the first cell and the holding member is higher than a thermal conductivity of a second adhesive filled between the second cell and the holding member.

7. The electric storage apparatus according to claim 1, wherein the holding member is provided by stacking a plurality of holding plates in a longitudinal direction of the plurality of cells, and
an internal diameter of the hole formed for holding the second cell in a first holding plate of the plurality of holding plates is different from an internal diameter of the hole formed for holding the second cell in another one of the plurality of holding plates.

8. The electric storage apparatus according to claim 1, wherein the first cell is one of the plurality of cells arranged in a rectangular shape that is located at a corner position in a direction of arrangement.

9. The electric storage apparatus according to claim 1, wherein, in a state in which the second cell is inserted through and held in the hole for inserting the second cell in the holding member, the second cell is placed such that a gap formed between an outer circumferential face of the second cell and an inner circumferential face of the hole is smaller on a far side less closer to the first cell and is larger on a near side closer to the first cell.

10. The electric storage apparatus according to claim 1, wherein the plurality of cells are connected in parallel.

11. A vehicle including the electric storage apparatus according to claim 1.

* * * * *